R. L. OWENS.
MACHINE FOR TRANSPLANTING PLANTS.
APPLICATION FILED NOV. 19, 1910.

1,073,702.

Patented Sept. 23, 1913.
5 SHEETS—SHEET 2.

WITNESSES

INVENTOR
RICHARD L. OWENS

BY
Paul & Paul
A. C. Paul
ATTORNEYS

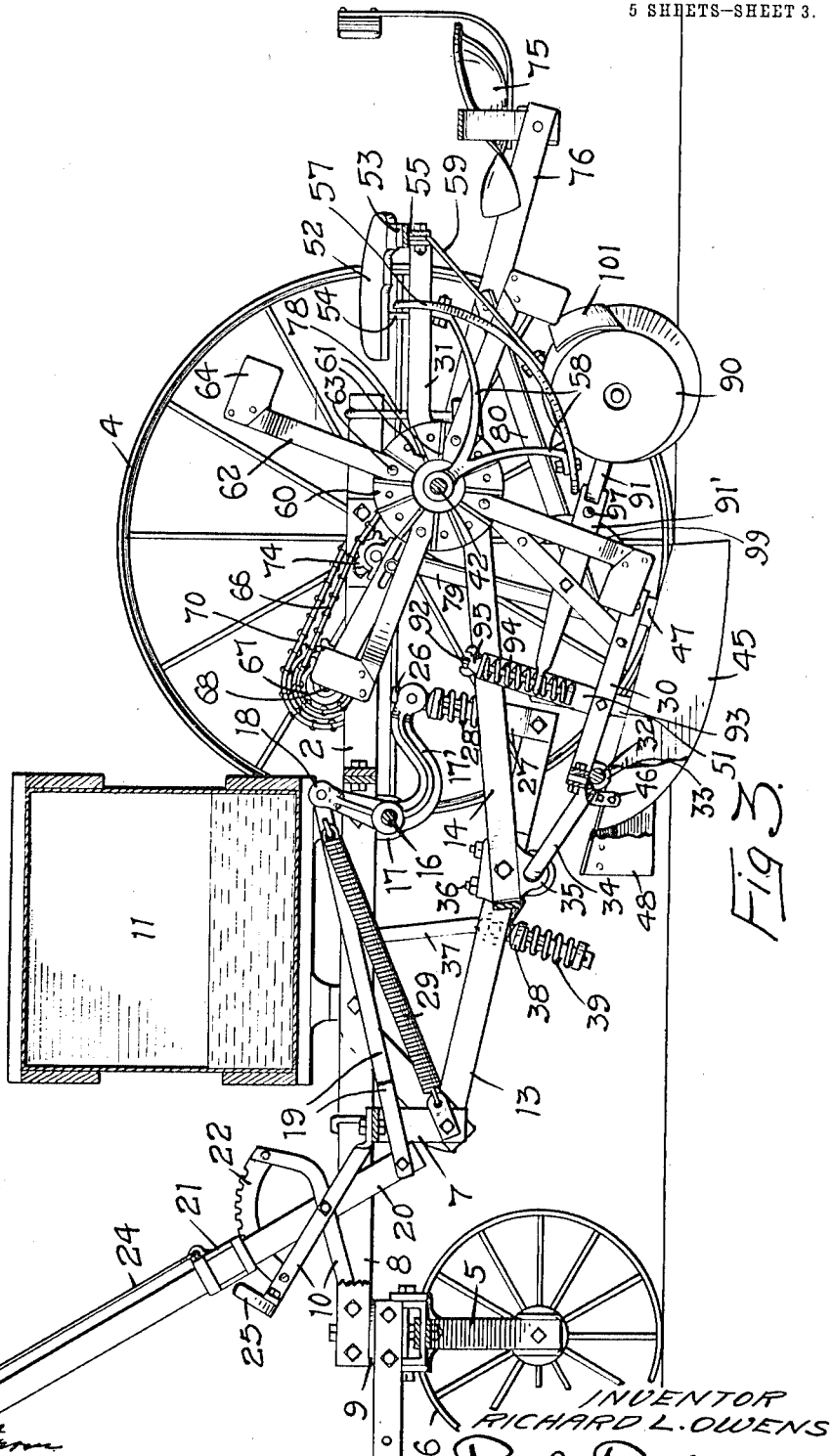

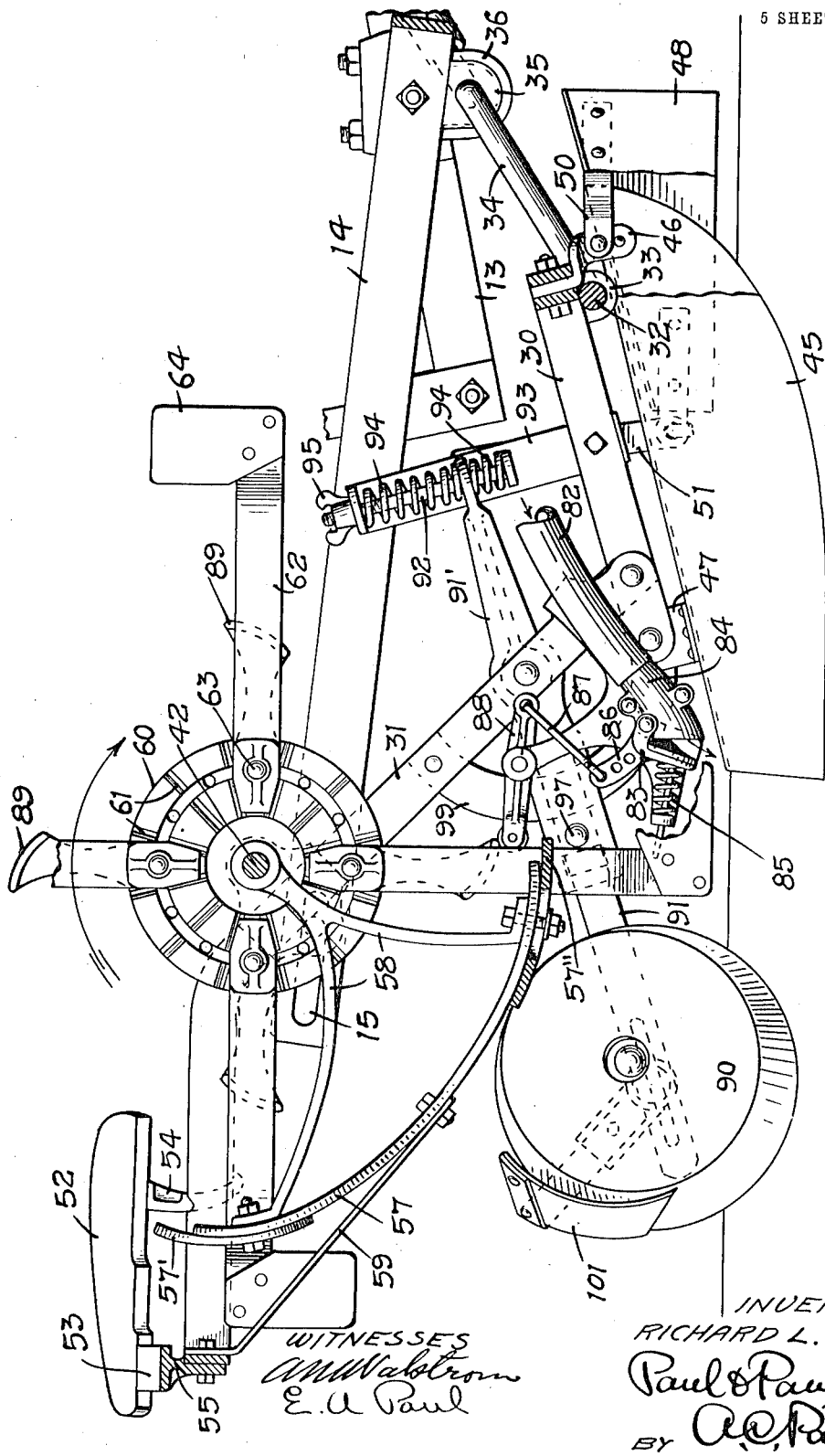

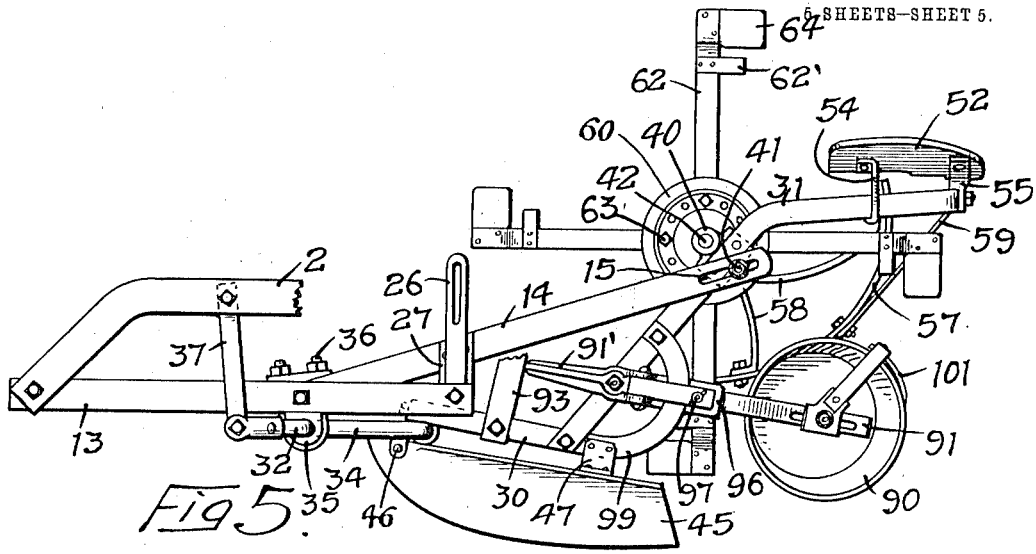
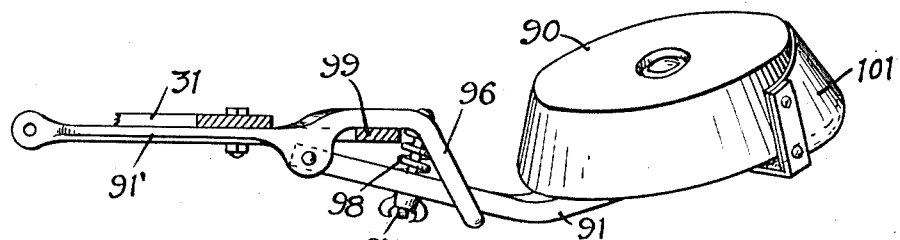
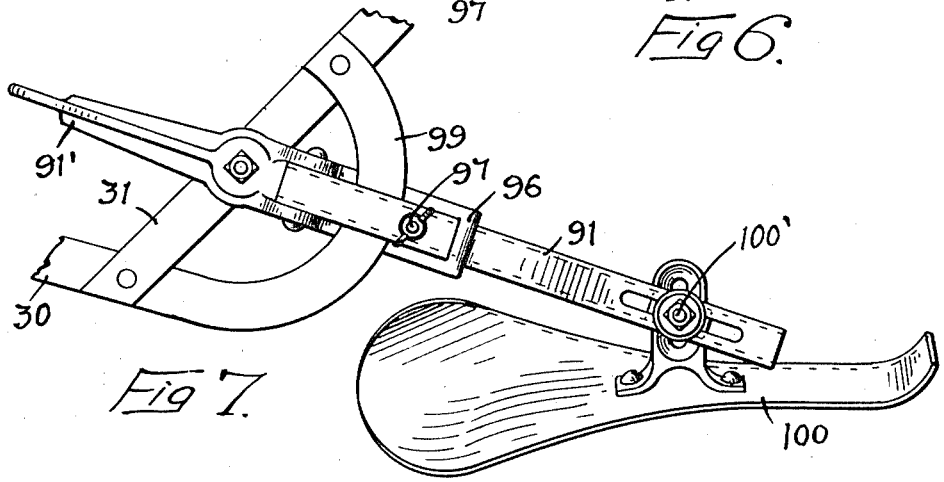

UNITED STATES PATENT OFFICE.

RICHARD L. OWENS, OF MINNEAPOLIS, MINNESOTA, ASSIGNOR TO J. L. OWENS MANUFACTURING COMPANY, OF MINNEAPOLIS, MINNESOTA.

MACHINE FOR TRANSPLANTING PLANTS.

1,073,702.        Specification of Letters Patent.      Patented Sept. 23, 1913.

Application filed November 19, 1910. Serial No. 593,280.

*To all whom it may concern:*

Be it known that I, RICHARD L. OWENS, of Minneapolis, in the county of Hennepin and State of Minnesota, have invented certain new and useful Improvements in Machines for Transplanting Plants, of which the following is a specification.

This invention relates to improvements in machines designed for transplanting or setting in the earth various plants such as tomato or tobacco plants; and the objects of the invention are to provide a machine by which the plants may be safely and expeditiously handled without bruising or crushing the same, and by which said plants may be set at any desired distance apart.

Another object of the invention is to provide a machine in which the furrow-opening, plant-setting and furrow-closing mechanisms are all so carried as to be capable of vertical adjustment, while at the same time retaining parallelism with the surface of the ground, thus enabling the plants to be set in a furrow or depression, or upon a ridge or elevation.

Figure 1:
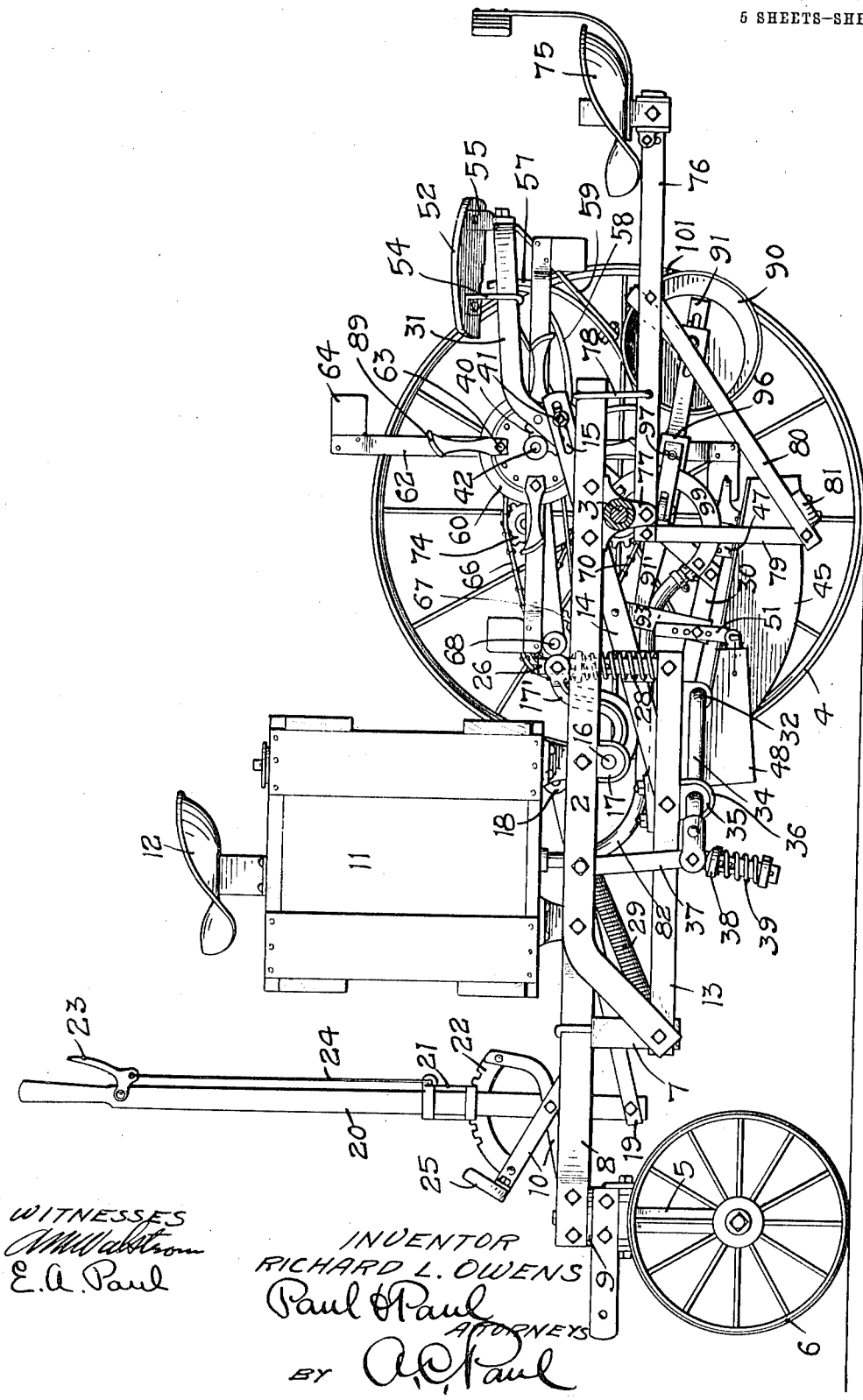
Figure 2:
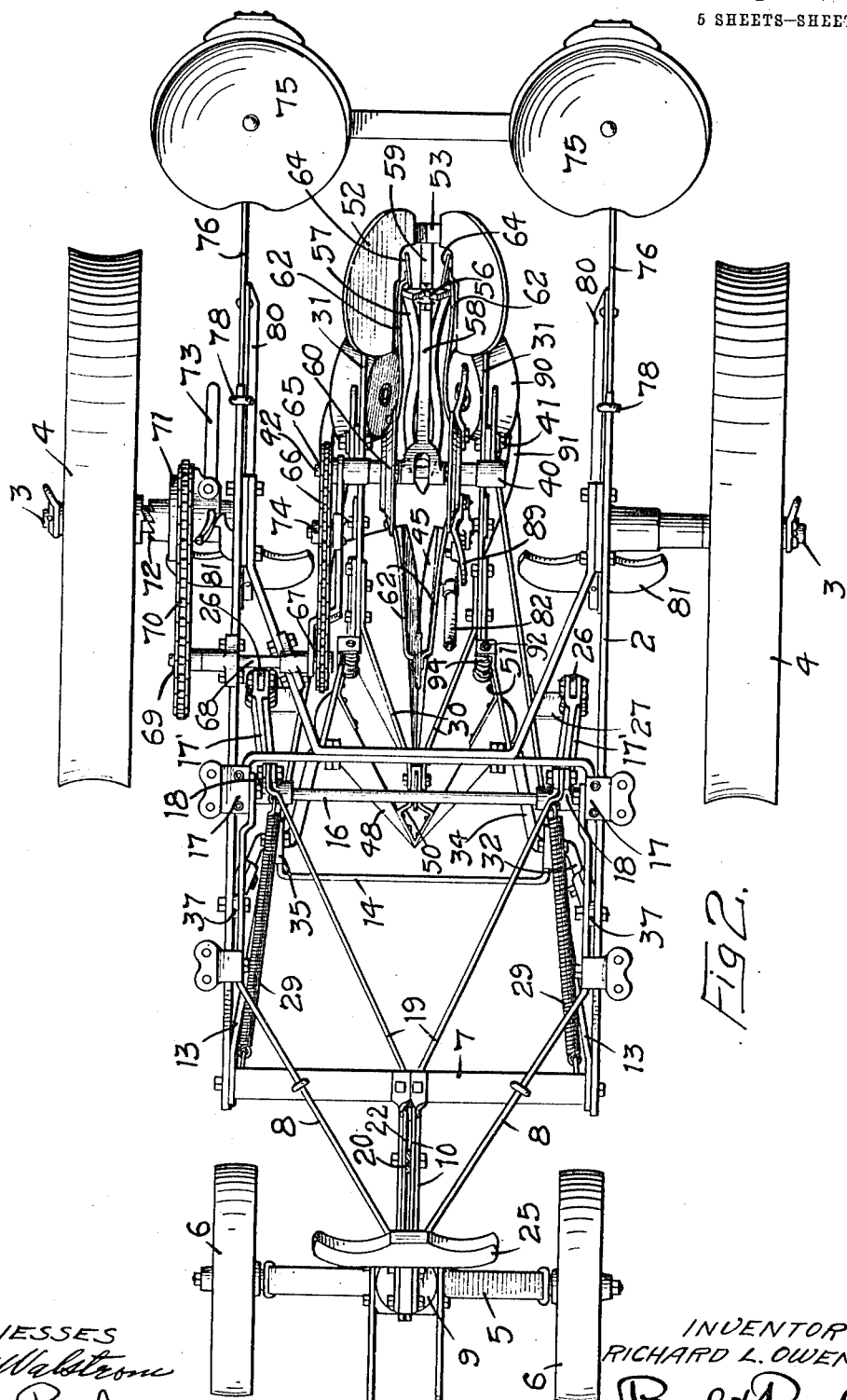

Other objects of the invention will appear from the following detailed description, taken in connection with the accompanying drawings in which, Figure 1 is a side elevation of a machine embodying my invention, with one of the axles in section and one of the wheels removed or omitted. Fig. 2 is a plan view of the machine, Fig. 3 is a longitudinal section, Fig. 4 is a detail elevation of the furrow-opening, plant-setting, and furrow-covering mechanisms; also showing the location of the plant watering pipe and the means for operating the valve therein. Fig. 5 is a detail elevation showing the main carrying frame and the auxiliary carrying frame, and means connecting the same, and also the relation of these parts to the truck frame. Fig. 6 is a detail of the furrow-covering wheel and supporting device. Fig. 7 is a detail showing a pressure plate substituted for the furrow-covering wheel.

In the drawings, 2 represents the truck or machine frame, which is provided with the stub axles 3, upon which are mounted the main or traction wheels 4. The truck frame is preferably of substantially rectangular form, and, at its forward end, it is supported upon a suitable forward truck of any preferred construction. I have here shown an arched axle 5 mounted upon wheels 6, to which axle the forward end of the frame 2 is pivoted by means of a suitable king-bolt, or other suitable device. As here shown, the frame 2 has the forward ends of its side bars extending downwardly and united by an arched cross bar 7; and, formed as a part of said truck frame, are the brace bars 8 which are united to the main side bars of said frame, and extend forward diagonally to a central block 9 on the forward truck. Suitable bars 10 extend from the cross bar 7 of the truck frame to the turning block on the forward truck. The forward truck may be provided with any suitable means by which a draft device, such as a suitable pole, may be attached, so that the machine may be drawn over the field to be planted by horse-power or other suitable means. Supported upon the truck frame is, preferably, a suitable water tank 11 upon which may be arranged a driver's seat 12.

*Main carrying frame.*—The main carrying frame is preferably pivoted to the depressed ends of the side bars of the truck frame. This main carrying frame consists preferably of two rearwardly extending bars 13 that are pivotally connected to the forward depressed ends of the said bars of the truck frame. At about the central portions of these bars there is a U-shaped bar 14 rigidly connected, at each side, to the bars 13, and extending rearwardly, and formed with slots 15 near the rear end of each part of said bar. The two bars 13, and the U-shaped bar 14, thus rigidly united, form what I designate the main carrying frame. This frame being pivoted to the truck frame at its forward end has its rear end capable of a swinging movement, upward and downward, as required.

For the purpose of raising and lowering the main carrying frame I provide a crank shaft 16 mounted in lugs or bearings 17 on the truck frame 2. This shaft has formed with, or secured to it, the rearwardly extending crank arms 17′; and the upwardly extending crank arms 18; these latter arms being connected to suitable rods 19 that extend forward to a point near the front of the truck frame and are connected to the lower end of a pivotally operating lever 20, preferably mounted on, or between, the bars 10, in position to be moved by the operator or driver seated on the machine. The lever 20 is preferably provided with a suitable latch 21 arranged to engage a notched quadrant 22, and this latch may be moved by a hand-lever 23 connected to the latching device by a rod or wire 24, and also, preferably, I provide a suitable foot rest 25 for the driver. The crank arms 17' are pivotally connected to suitable links 26, and the lower ends of said links are connected to the main carrying frame, preferably at the rear ends of the bars 13. The two parts of the frame are further preferably braced by cross bars 27. The links 26 are preferably slotted, and the pins connecting said links and crank arms preferably pass through said slots. Springs 28 surround the links and bear against said frame. This provision of the slotted links in the mechanism for raising the carrying frame causes said frame to be held down by yielding pressure, and, therefore, permits said frame to rise automatically in case the furrow-opening mechanism, hereinafter described, encounters a rock or other rigid obstruction. Suitably coiled springs 29 are preferably connected to the truck frame, and also to the crank arms 18, for the purpose of counterbalancing the weight of the carrying frames.

The main carrying frame thus described is intended to indirectly support, through the auxiliary carrying frame hereinafter described, all of the operative mechanisms of the machine. While the construction of this machine that I have described has been found to be practical and efficient and constitutes what I consider a preferable form, I do not limit myself to this particular construction of the main carrying frame, and it is obvious that the same may be varied in many particulars without departing from my invention.

*Auxiliary carrying frame.*—In addition to the main carrying frame, already described, I provide another frame, which, for briefness in description, and to readily distinguish it from the main carrying frame, I designate the auxiliary carrying frame. This frame is pivotally connected to the main carrying frame in such manner as to cause the mechanisms supported by it to rise and fall, as the main frame is moved up and down, while retaining a position that is at all times substantially parallel with the surface of the ground. I accomplish this result by the manner in which I connect the two frames together. The auxiliary carrying frame, as here shown, consists of the diagonal bars 30 and the upwardly and rearwardly inclined bars 31, rigidly secured to said bars 30, and preferably terminating near the rear end of the machine. This auxiliary frame is connected at its forward end to the main carrying frame by means of a double crank shaft 32. The straight part of the shaft preferably extends under the forward end of the auxiliary frame, and is pivotally connected thereto by suitable connections 33, and the arms 34 of said crank shaft extend to bearing blocks 35, secured to the forward part of the main carrying frame by clevises 36. Off-set portions of the crank arms have bearings in these blocks and then the ends of the arms extend to, and are pivotally connected with, the hangers 37, which are pivotally connected at their upper ends to the truck frame. The lower ends of these hangers are preferably slotted and the crank arms are connected to said hangers by pins that extend through said slots. Blocks 38 on the hangers are held against the crank arms by springs 39. This method of connecting the parts permits the connecting pins between the crank arms and the hangers to yield downwardly in case the furrow-opener strikes against an obstruction that is sufficiently rigid to raise said furrow-opener and thereby to throw down the ends of the crank arms and compress the springs 39. The bars 31 of the auxiliary carrying frame are provided with suitable lugs 40, in which are secured suitable pins 41 that project into the slots 15, hereinbefore referred to, in the bars 14 of the main carrying frame. The lugs 40 are preferably riveted to the said bars 31 and they also form bearings for the shaft 42 of the rotary plant setter, hereinafter described.

By examining Fig. 5 of the drawings, the construction of the carrying frames and their relation to each other and to the truck frame will be readily understood. It will be seen that the main carrying frame is pivotally connected at its forward end to the truck frame, and, as here shown, to the depending ends of the main side bars of said frame. The rear ends of the legs of the U-shaped bar 14, forming part of this frame, are provided with longitudinal slots 15 and by means of the mechanism hereinbefore described, this frame may be raised and lowered, turning upon its pivotal connection with the truck frame. The auxiliary frame has the forward end of its bars 30 connected to the double crank shaft 32 and the arms 34 on this shaft constitute levers which connect the auxiliary carrying frame to the main carrying frame. As the forward ends of these levers or crank arms are connected to the hangers 37, extending downward from the main truck frame, and as the rear portions of the auxiliary frame are connected by the bolts 41 to the slot 15 in the rear portion of the main frame, it follows that, as the main frame is raised or lowered, the auxiliary frame must also be raised or lowered, and if the furrow-opening, plant-setting and furrow-closing mechanisms partook of the same movement as the main carrying frame there would be only one position in which these parts would be substantially parallel with the surface of the ground, and in position for effective work in setting out plants. By having, however, the slotted connection between the rear ends of the two frames, and the crank shaft connection between the forward end of the auxiliary frame and the main carrying frame, it will be seen that the forward end of the auxiliary frame will travel in a vertical direction faster than the corresponding portion of the main carrying frame, and thereby the auxiliary frame, and the mechanism supported by it, will maintain their relative position to the surface of the ground regardless of the distance that said devices are below the level of the truck frame. I consider this feature of my invention of great importance, as it makes it possible to use the machine with the plant setting mechanism arranged at any distance below the truck frame. This enables me to set the plants to a greater or less depth in the earth; to operate the machine with the planting mechanism in a furrow or depression, or with said parts on a ridge or elevation; and the machine will work equally well with the parts in any one of these positions. The mechanisms that are attached to the said auxiliary frame are a suitable furrow-opener, a plant-setter and a furrow-closer or coverer. This frame also carries the end of the tube leading from the water tank and the mechanism which operates the valve at the end of said tube, permitting the desired amount of water to be dropped into the furrow as each plant is put in place. While I do not limit myself to the details of the mechanism for performing these several functions, I have illustrated in the drawings a construction of said devices that I consider preferable, and I will now proceed to describe such mechanisms, as I have shown them in the drawings.

*The furrow-opener.*—The furrow-opener consists preferably of a V-shaped plow 45, secured at its point or apex to the auxiliary carrying frame by a suitable lug 46, and the rear portions of the wings of said plow are secured to the bars 30 of the auxiliary frame by suitable lugs 47. Said plow or opener is thus rigidly united to the bars 30 of the auxiliary frame and must move with said bars as the frame is lowered or depressed. I prefer to provide a supplementary plow 48, also secured to the auxiliary frame in front of the furrow-opener. This plow is of V-shape and is adjustably connected to the auxiliary frame by means of the connections 50 and 51. The supplementary plow stands in front of the furrow-opener and at a higher level and is designed to clear off clods and obstructions from the surface of the ground, so as to prevent them from interfering with the operation of the transplanting mechanism, and it also serves to level off any uneven portion of the surface of the ground. The furrow-opener is adjusted so as to make a furrow of the desired depth in the ground into which the plants are to be set, and in operation it is customary to adjust the furrow-opener when the machine is on the ground ready for operation, so as to get a furrow of the depth desired, regard being had to the condition of the ground and to the size of the plants and the depth to which they should be set in the ground.

*The plant setter.*—The plant setter takes the plants one by one from a plant holder, on which they are placed by hand, carries them around and sets them up vertically in the furrow, directly behind the furrow-opener. The plants are placed on a suitable plant holder, which consists of inwardly inclined plates 52 connected by a narrow cross plate 53 and having an opening between them through which the arms of the plant setter may pass. The plant holder is supported by standards 54 and 55 upon the rear end of the bars 31 of the auxiliary frame. This cross plate 53 supports the rear or root end of the plant while the forward end is supported in a V-shaped recess 56 in the upper end of a curved cam plate 57, that is carried on the shaft 42 by means of a hanger 58. This curved cam plate is also preferably connected to the rear end of the auxiliary frame by a brace rod 59. The cam plate 57 is preferably provided with the adjustable ends 57' and 57" see Fig. 4 by means of which said cam plate can be lengthened to regulate the point at which the plants will be picked up or released. The plants are laid one by one on the support formed by the cross plate 53 and the V-shaped end of the cam plate 57. The shaft 42 has secured rigidly thereto, so as to rotate therewith, the two disks 60. These disks are provided upon their inner surfaces with radial recesses 61 in which are secured spring arms 62, having preferably the projecting tail pieces 62' see Fig. 5. The inner ends of these arms are preferably secured to the disks by bolts 63 or other suitable devices. The outer ends of the spring arms carry the plant engaging plates 64. I have shown four of these sets of plant carrying arms on the disks, but it will be noted that there are other spaces or recesses in the disks which will permit of the attachment of other arms, and such other arms may be applied when it it desired to set the plants closer together.

The resiliency of the spring arms 62 tends to bring their outer ends toward each other and thereby to bring the plant carrying plates 64 into contact with each other. The edges of the curved cam plate 57 form a separator, by which the arms are sprung apart, and are held apart while they are traveling in engagement with the edges of said plate. It will be noted that the upper end of the curved cam plate 57 is gradually tapered off at each side, thereby permitting the tail pieces 62' of the arms 62 to gradually slip off from the cam plate 57 and thereby allowing the spring arms 62 to gradually approach each other. I provide suitable means for rotating the shaft carrying the plant setting arms. As here shown one end of the shaft 42 is provided with a sprocket wheel 65, and this is driven by a sprocket chain 66 from a sprocket wheel 67 on a shaft 68 that is mounted in bearings on the truck frame. This shaft is provided with a sprocket 69 from which extends a sprocket chain 70, to a sprocket gear formed upon a hub 71 that is mounted loosely upon one of the stub axles 3. The hub 71 is provided with clutch teeth 72 adapted to engage corresponding teeth on the hub of the wheel 4, and a clutch lever 73 is provided, by means of which the hub 71 may be clutched with the wheel 4 when it is desired to drive the plant-setting mechanism. A suitable tightener sprocket 74 is arranged to engage the chain 66 and thereby to retain proper tension upon the said chain as the auxiliary carrying frame is raised or lowered.

In operation the plants are laid, one by one, upon the plant support, and, as the plant-setter is rotated, the spring arms engaging the curved cam plate 57 are separated and are held in a separated position until the plant carrying plates 64 come into a position where they are on opposite sides of the stem on the plant support. The spring arms are permitted to gradually approach each other by means of the beveled edges of the end of the cam plate 57 and the tail pieces 62' on the arms 62, and the plants are thereby pressed very easily and gently between said plates 64, and are picked up and carried around and their root ends are brought into the furrow in the rear of the furrow-opener. Just as they reach this point and are in a vertical position, with the root ends down, the arms 62 come in contact with the end of the cam plate 57, and said arms are thereby quickly separated and the plants released while they are standing upright in the furrow.

For convenience I prefer to provide, upon each side of the machine, a suitable seat 75. These seats are secured to bars 76 that are pivoted at their forward ends upon lugs 77 that are secured to the truck frame, and, as here shown, are directly below the stub axles 3. Suitable links 78 are connected to the bars 76 and also to the rear of the truck frame. By using longer or shorter links the seats may be lowered or raised. I also prefer to provide in connection with each bar 76, a vertical bar 79, having its upper end rigidly secured to the end of the bar 76, with an inclined bar 80, having its lower end connected to the bar 79 and the upper end to the bar 76. A foot rest 81 may be secured to the bar 80. These parts, of course, may be varied in many particulars without departing from my invention.

In operating the machine preferably a small boy or other person may be seated upon each of the seats 75. These persons are given a supply of the plants and they place them one at a time on the plant support with the top ends forward and in proper position to be grasped by the plant-engaging plates, and thereby they are lifted out and carried around and deposited in the furrow as already described.

*Plant watering device.*—From the tank 11 I prefer to extend a suitable hose 82 to a point in the rear of the furrow-opener. The end of this hose is provided with a valve (see Fig. 4) which, as here shown, consists preferably of a pivoted plate 83 on the end of a rigid hose section 84. A spring 85 tends to hold the valve to its seat. A projection 86, having a series of holes therein, is arranged on the valve, and a link 87 is connected to one of these holes and to a tripping lever 88. A cam 89 is arranged upon one of the rotating disks opposite each of the spring arms 62, and the arrangement of the parts is such that just as the plant is deposited in the furrow the valve 83 is opened and a small amount of water is poured into the furrow around the roots of the plant.

*Furrow-covering device.*—I may use any suitable mechanism for moving the earth back into the furrow and pressing it around the plants that have been placed in the furrow. I have shown in the drawings a pair of inclined beveled wheels 90, supported upon two-part levers 91, 91', that are in turn pivoted upon the bars 31 of the auxiliary frame. The forward ends of said levers have pins 92 passing through them and said pins are supported in lugs on standards 93, secured to the bars 30 of the auxiliary frame. Springs 94 are arranged upon said pins on opposite sides of said levers, and a suitable nut 95 is provided for adjusting the tension of said springs. This spring connection allows of some freedom of movement of the furrow-closing wheels 90 and permits them to yield vertically to accommodate themselves to the inequalities of the surface. By adjusting the tension of the springs, by the means described, the wheels may be caused to press the soil more or less firmly into the furrow and about the roots of the plants. The part 91 of each lever passes through a loop 96 at the end of the part 91' and is pivoted in suitable ears or lugs formed on said part 91'. This permits a horizontal adjustment of the wheels 90. An adjusting bolt 97 passes through the two parts of the lever, and a spring 98 is arranged to separate the said parts of the lever within the limits permitted by said bolt 97. By these means the wheels 90 are capable of both a vertical and a horizontal movement, or a combination of the two movements, and this permits them to be adjusted so as to fill the furrow and pack the earth firmly about the plants. I also prefer to provide a curved guide plate 99 upon the bar 31, which guides the said two-part lever in its vertical adjustment.

In place of using the covering wheel 90 I may substitute a suitable pressure plate 100 that is secured to the end of the two-part lever 91, 91', by a suitable bolt 100' in place of the beveled wheel, and which serves to drag the earth back into the furrow and press it around the plants after the plants have been set into the ground. Where the wheels are used a suitable scraper 101 may be employed to keep the edge of the wheel free from dirt.

I do not limit myself to the details of construction herein shown and described as many variations thereof may be made without departing from my invention.

I claim as my invention:

1. In a machine of the class described, the combination, with a truck frame and its supporting wheels, of a main carrying frame pivotally supported upon said truck frame, means for raising and lowering said main carrying frame, an auxiliary carrying frame supported upon the main carrying frame, means connecting said auxiliary carrying frame with said main carrying frame and causing the auxiliary frame to maintain a position substantially parallel with the surface of the ground as said frames are raised or lowered, and plant setting means mounted upon said auxiliary carrying frame, substantially as described.

2. In a machine of the class described, the combination, with a truck frame and its supporting wheels, of a main carrying frame pivotally supported at its forward end upon said truck frame, means for raising and lowering said main carrying frame, an auxiliary carrying frame, means connecting said auxiliary frame with the main carrying frame and means for holding the auxiliary frame in a position substantially parallel with the surface of the ground as said frames are raised or lowered, and plant setting means mounted upon said auxiliary carrying frame, substantially as described.

3. In a machine of the class described, the combination, with a truck frame and its supporting wheels, of a main carrying frame pivotally supported upon said truck frame, means for raising and lowering the said main carrying frame, an auxiliary carrying frame, a double crank shaft connecting the forward end of the auxiliary frame to the main carrying frame, and a slotted connection between the rear ends of said frames, substantially as described.

4. In a machine of the class described, the combination, with a truck frame and its supporting wheels, of a main carrying frame pivotally supported at its forward end upon said truck frame, means for raising and lowering said main carrying frame, an auxiliary carrying frame supported at its forward end upon the main carrying frame by a crank connection, a slotted connection between the rear end of the auxiliary frame and the main carrying frame, and plant setting means mounted upon said auxiliary carrying frame, substantially as described.

5. In a machine of the class described, the combination, with a truck frame and its supporting wheels, of a main carrying frame pivotally supported upon said truck frame, means for raising and lowering said main carrying frame, an auxiliary carrying frame supported upon the main carrying frame, means connecting said auxiliary carrying frame with said main carrying frame and causing the auxiliary frame to maintain a position substantially parallel with the surface of the ground as said frames are raised or lowered, and a furrow-opener, a plant-setter, and a furrow-covering mechanism, mounted upon said auxiliary carrying frame, substantially as described.

In witness whereof, I have hereunto set my hand this 10th day of November 1910.

RICHARD L. OWENS.

Witnesses:
  G. E. SORENSEN,
  E. A. PAUL.